United States Patent
Yerramalla et al.

(10) Patent No.: US 8,862,433 B2
(45) Date of Patent: Oct. 14, 2014

(54) PARTITIONING OF TURBOMACHINE FAULTS

(75) Inventors: Sampath K. Yerramalla, Manchester, CT (US); William Donat, Manchester, CT (US); Ravi Rajamani, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 975 days.

(21) Appl. No.: 12/782,685

(22) Filed: May 18, 2010

(65) Prior Publication Data

US 2011/0286831 A1   Nov. 24, 2011

(51) Int. Cl.
- *G01F 11/30* (2006.01)
- *G05B 9/02* (2006.01)
- *G05B 23/02* (2006.01)

(52) U.S. Cl.
CPC .............. *G05B 23/0254* (2013.01); *G05B 9/02* (2013.01); *G05B 2219/37205* (2013.01); *G05B 2219/37545* (2013.01)
USPC ....................................................... 702/183

(58) Field of Classification Search
USPC ....................................................... 702/183
See application file for complete search history.

(56) References Cited

U.S. PATENT DOCUMENTS

| | | | |
|---|---|---|---|
| 4,642,782 A | 2/1987 | Kemper et al. | |
| 4,649,515 A | 3/1987 | Thompson et al. | |
| 4,905,162 A | 2/1990 | Hartzband et al. | |
| 4,970,657 A | 11/1990 | Wolf | |
| 5,080,496 A | 1/1992 | Keim et al. | |
| 5,105,372 A | 4/1992 | Provost et al. | |
| 5,179,625 A | 1/1993 | Hisano | |
| 5,233,512 A | 8/1993 | Gutz et al. | |
| 5,279,107 A | 1/1994 | Meisner et al. | |
| 5,293,323 A | 3/1994 | Doskocil et al. | |
| 5,447,059 A | 9/1995 | Miller et al. | |
| 5,489,829 A | 2/1996 | Umida | |
| 5,566,092 A | 10/1996 | Wang et al. | |
| 5,631,831 A | 5/1997 | Bird et al. | |
| 5,689,066 A | 11/1997 | Stevenson | |
| 5,726,891 A | 3/1998 | Sisson et al. | |

(Continued)

FOREIGN PATENT DOCUMENTS

| | | |
|---|---|---|
| EP | 0858017 | 8/1998 |
| EP | 1114991 | 7/2001 |

(Continued)

OTHER PUBLICATIONS

Rolf Iserman, Model-Based Fault Detection and Diagnosis, (2004).*

(Continued)

*Primary Examiner* — Sujoy Kundu
*Assistant Examiner* — Alvaro Fortich
(74) *Attorney, Agent, or Firm* — Carlson, Gaskey & Olds, P.C.

(57) ABSTRACT

An example method of partitioning turbomachine faults includes using a modeling computer to model a system, to establish a modeled gas path parameter, and to establish a modeled subsystem parameter. The method then determines a gas path condition representing a difference between an actual gas path parameter and the modeled gas path parameter. The method also determines a subsystem condition representing a difference between an actual subsystem parameter and the modeled subsystem parameter. The method diagnoses a sensor failure based on the gas path condition and the subsystem condition.

15 Claims, 4 Drawing Sheets

(56) References Cited

U.S. PATENT DOCUMENTS

| | | |
|---|---|---|
| 5,949,678 A | 9/1999 | Wold et al. |
| 5,951,611 A | 9/1999 | La Pierre |
| 6,073,262 A | 6/2000 | Larkin et al. |
| 6,098,011 A | 8/2000 | Scott |
| 6,128,555 A | 10/2000 | Hanson et al. |
| 6,181,975 B1 | 1/2001 | Gross et al. |
| 6,282,884 B1 | 9/2001 | Adibhatla et al. |
| 6,292,723 B1 | 9/2001 | Brogan et al. |
| 6,304,833 B1 | 10/2001 | Ferkinhoff et al. |
| 6,389,887 B1 | 5/2002 | Dusserre-Telmon et al. |
| 6,408,259 B1 | 6/2002 | Goebel et al. |
| 6,408,290 B1 | 6/2002 | Thiesson et al. |
| 6,415,276 B1 | 7/2002 | Heger et al. |
| 6,456,928 B1 | 9/2002 | Johnson |
| 6,456,991 B1 | 9/2002 | Srinivasa et al. |
| 6,459,963 B1 | 10/2002 | Bennett et al. |
| 6,463,380 B1 | 10/2002 | Ablett et al. |
| 6,466,858 B1 | 10/2002 | Adibhatla et al. |
| 6,502,085 B1 | 12/2002 | Adibhatla et al. |
| 6,532,412 B2 | 3/2003 | Adibhatla et al. |
| 6,539,337 B1 | 3/2003 | Provan et al. |
| 6,539,783 B1 | 4/2003 | Adibhatla |
| 6,564,109 B1 | 5/2003 | Ashby et al. |
| 6,598,195 B1 | 7/2003 | Adibhatla et al. |
| 6,606,580 B1 | 8/2003 | Zedda et al. |
| 6,662,089 B2 | 12/2003 | Felke et al. |
| 6,745,157 B1 | 6/2004 | Weiss et al. |
| 6,760,689 B2 | 7/2004 | Follin et al. |
| 6,768,982 B1 | 7/2004 | Collins et al. |
| 6,782,376 B2 | 8/2004 | Sato et al. |
| 6,804,612 B2 | 10/2004 | Chow et al. |
| 6,807,537 B1 | 10/2004 | Thiesson et al. |
| 6,813,615 B1 | 11/2004 | Colasanti et al. |
| 6,823,253 B2 | 11/2004 | Brunell |
| 6,823,675 B2 | 11/2004 | Brunell et al. |
| 6,895,298 B2 | 5/2005 | Page |
| 6,909,960 B2 * | 6/2005 | Volponi et al. ............ 701/100 |
| 6,917,839 B2 | 7/2005 | Bickford |
| 6,944,566 B2 | 9/2005 | Chen et al. |
| 6,950,812 B2 | 9/2005 | Suermondt et al. |
| 6,952,688 B1 | 10/2005 | Goldman et al. |
| 6,962,043 B2 | 11/2005 | Venkateswaran et al. |
| 7,020,595 B1 | 3/2006 | Adibhatla et al. |
| 7,031,878 B2 | 4/2006 | Cuddihy et al. |
| 7,136,809 B2 | 11/2006 | Volponi |
| 7,140,186 B2 | 11/2006 | Venkateswaran et al. |
| 7,216,071 B2 | 5/2007 | Volponi |
| 7,280,941 B2 | 10/2007 | Bonanni et al. |
| 7,337,086 B2 | 2/2008 | Guralnik et al. |
| 7,441,448 B2 * | 10/2008 | Volponi ............ 73/112.03 |
| 7,761,223 B2 * | 7/2010 | Wang et al. ............ 701/114 |
| 7,864,687 B2 * | 1/2011 | Qian et al. ............ 370/242 |
| 2001/0042229 A1 | 11/2001 | James |
| 2002/0040278 A1 | 4/2002 | Anuzis et al. |
| 2002/0066054 A1 | 5/2002 | Jaw et al. |
| 2002/0092344 A1 * | 7/2002 | Ward et al. ............ 73/116 |
| 2002/0129799 A1 * | 9/2002 | Wang et al. ............ 123/568.16 |
| 2002/0193891 A1 * | 12/2002 | Ushiku ............ 700/21 |
| 2003/0065483 A1 | 4/2003 | Ting et al. |
| 2004/0088100 A1 * | 5/2004 | Volponi ............ 701/100 |
| 2004/0123600 A1 * | 7/2004 | Brunell et al. ............ 60/773 |
| 2004/0153815 A1 | 8/2004 | Volponi |
| 2004/0225587 A1 | 11/2004 | Messmer et al. |
| 2005/0096873 A1 | 5/2005 | Klein |
| 2005/0114090 A1 | 5/2005 | Black et al. |
| 2005/0154509 A1 | 7/2005 | Schubert et al. |
| 2005/0222747 A1 * | 10/2005 | Vhora et al. ............ 701/100 |
| 2007/0118271 A1 * | 5/2007 | Wiseman et al. ............ 701/100 |
| 2008/0097662 A1 | 4/2008 | Volponi |
| 2008/0120074 A1 | 5/2008 | Volponi |
| 2008/0154473 A1 * | 6/2008 | Volponi et al. ............ 701/100 |
| 2008/0155964 A1 * | 7/2008 | Kilkenny ............ 60/286 |
| 2008/0177505 A1 * | 7/2008 | Volponi ............ 702/185 |
| 2010/0023238 A1 * | 1/2010 | Adibhatla ............ 701/100 |
| 2012/0065785 A1 * | 3/2012 | Bartshe et al. ............ 700/282 |
| 2012/0148382 A1 * | 6/2012 | Kruger et al. ............ 415/1 |

FOREIGN PATENT DOCUMENTS

| | | |
|---|---|---|
| EP | 1204076 | 8/2002 |
| EP | 2149824 | 2/2010 |
| EP | 2149832 | 2/2010 |
| EP | 2175336 | 4/2010 |
| WO | WO9741494 | 11/1997 |
| WO | WO0148571 | 7/2001 |
| WO | 0246848 | 6/2002 |

OTHER PUBLICATIONS

European Search Report, EP Application No. 11166633, mailed Sep. 20, 2011.

European Examination Report for European Application No. 11166633.5 dated Jun. 27, 2013.

* cited by examiner

PARTITIONING OF TURBOMACHINE FAULTS

BACKGROUND

This disclosure relates generally to partitioning faults. More particularly, this disclosure relates to diagnosing operational faults detected within a turbomachine as a module performance change, an actuator fault, or a sensor fault.

Turbomachines (e.g., gas turbine engines) are known. A typical turbomachine includes multiple modules or sections, such as a fan module, a compression module, a combustor module, a turbine module, etc. Measuring parameters of the turbomachine facilitates identifying operational faults. For example, measuring the temperature and pressures of the modules can indicate changes in the performance of the module and help in identifying faults related to module performance. Another operational fault relates to actuators of the turbomachines. As known, the actuators manipulate the positions of various components that are essential for proper operation of the turbomachinery. An example actuator fault includes an actuator that is stuck in a closed position, which can negatively affect performance of the turbomachine.

Turbomachines include sensors that measure parameters along the gas paths of the turbomachine. Example gas path measurements include the rotational speeds of turbomachine spools, the temperature of gas exhausted from the turbomachine, etc. Other sensors of the turbomachine measure parameters within subsystems of the turbomachine. Example subsystem measurements include turbine case cooling temperatures, air bleed flow, variable stator vanes measurements, etc. Still other sensors measure power conditions of the turbomachine. If the turbomachine is a gas turbine engine, some sensors may measure flight conditions. Examples of these measurements include Mach numbers, altitudes, ambient temperatures, power requirements, etc. Failure of the sensors may result in inaccurate measurements. Sensor failure is another type of operational fault.

SUMMARY

An example method of partitioning turbomachine faults includes using a modeling computer to model a system, to establish a modeled gas path parameter, and to establish a modeled subsystem parameter. The method then determines a gas path condition representing a difference between an actual gas path parameter and the modeled gas path parameter. The method also determines a subsystem condition representing a difference between an actual subsystem parameter and the modeled subsystem parameter. The method diagnoses a sensor failure based on the gas path condition and the subsystem condition.

Another example method of partitioning gas turbine engine faults includes establishing a model of a gas turbine engine, using the model to determine a modeled gas path parameter, and using the model to determine a modeled subsystem parameter. The method identifies a fault in the gas turbine engine based on a comparison of the modeled gas path parameter to a measurement of an actual gas path parameter of the gas turbine engine, and based on a comparison of the modeled subsystem parameter to an actual subsystem parameter from the gas turbine engine.

An example arrangement for partitioning gas turbine engine faults includes a modeling computer configured to establish a model of a gas turbine engine. The modeling computer determines a modeled gas path parameter and a modeled subsystem parameter. A controller module is configured to identify a fault in the gas turbine engine based on comparison of the modeled gas path parameter to a measurement of an actual gas path parameter received from the gas turbine engine, and a comparison of the modeled subsystem parameter to an actual subsystem parameter received from a gas turbine engine.

These and other features of the disclosed examples can be best understood from the following specification and drawings, the following of which is a brief description:

DETAILED DESCRIPTION

Figure 1:
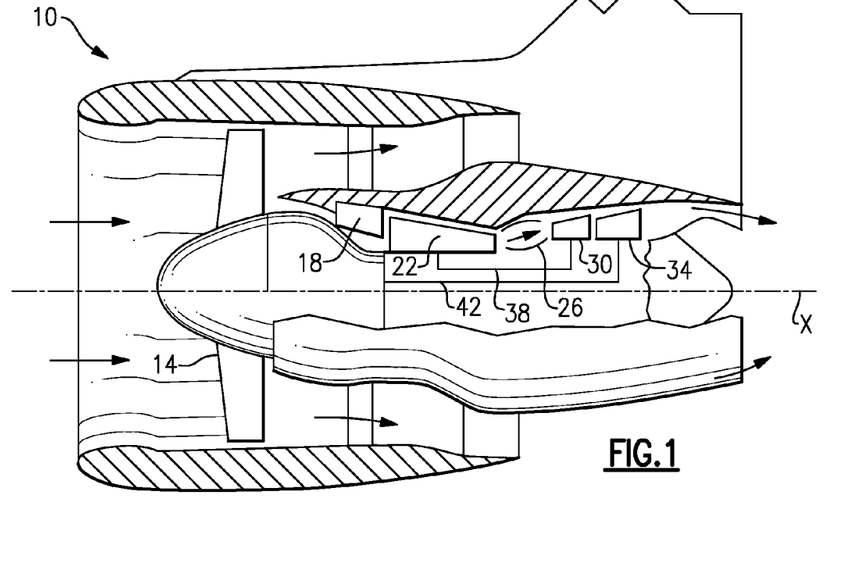
FIG. 1 shows a sectional view of an example gas turbine engine.

FIG. 1 schematically illustrates an example gas turbine engine 10, which is a type of turbomachine. The example gas turbine engine 10 includes (in serial flow communication) a fan section 14, a low pressure compressor 18, a high pressure compressor 22, a combustor 26, a high pressure turbine 30, and a low pressure turbine 34. The gas turbine engine 10 is circumferentially disposed about an engine centerline X.

During operation, air is pulled into the gas turbine engine 10 by the fan section 14. Some of the air is pressurized by the compressors 18 and 22, mixed with fuel, and burned within the combustor 26. The turbines 30 and 34 extract energy from the hot combustion gases flowing from the combustor 26.

In a two spool design, the high pressure turbine 30 utilizes the extracted energy from the hot combustion gases to power the high pressure compressor 22 through a high speed shaft 38, and the low pressure turbine 34 utilizes the extracted energy from the hot combustion gases to power the low pressure compressor and the fan section 14 through a low speed shaft 42.

The examples described in this disclosure are not limited to the two spool engine architecture described, however, and may be used in other architectures, such as single spool axial design, a three spool axial design, and still other architectures. Further, although the examples described herein are described with regard to the gas turbine engine 10, those having skill in this art and the benefit of this disclosure will understand that other examples include other types of turbomachines.

Figure 2:
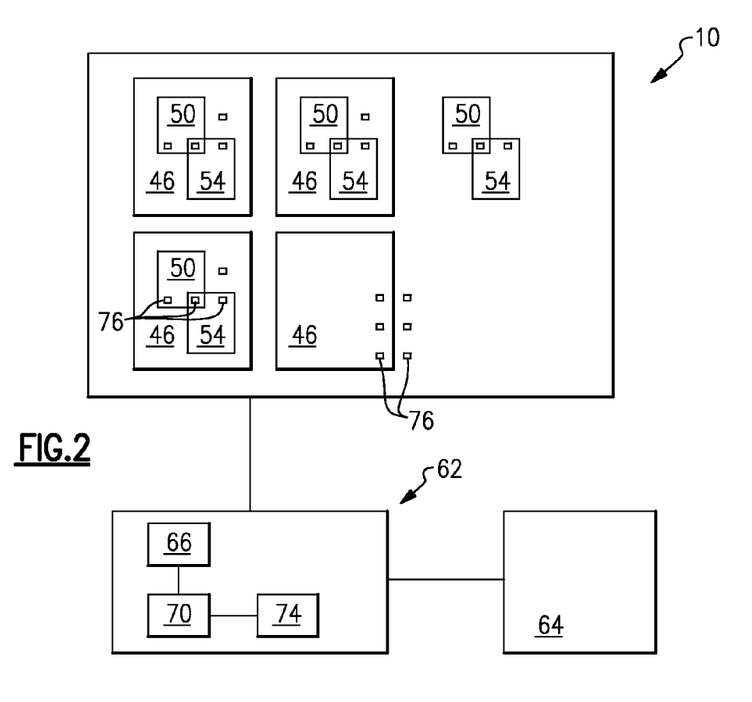
FIG. 2 shows a highly schematic view of an arrangement configured to partition faults within the gas turbine engine of FIG. 1.

Referring now to FIG. 2 with continuing reference to FIG. 1, in an example fault partitioning arrangement 46, the sections of the engine 10 correspond generally to engine modules 46. Some of the engine modules 46 include subsystem actuators 54. The example engine 10 also includes subsystem actuators 54 that are not located within the engine modules 46. Some of the engine modules 46 include subsystem sensors 76. The example engine 10 also includes subsystem sensors 76 that are not located within the engine modules 46.

In this example, the fault partitioning arrangement 46 includes a modeling computer 62 configured to generate a physics-based model 64 of the gas turbine engine 10. The example modeling computer 62 includes a memory module 66, a controller module 70, and a display 74. In one example, an engine simulation program, such as MATLAB, stored in the memory module 66 and executed with the controller module 70 is used to generate the model 64. Other examples utilize other types of software to generate the model 64.

Many types of modeling computers 62 can be used to implement various functions described herein. In terms of hardware architecture, modeling computer 62 can additionally include one or more input and/or output (I/O) device interface(s) that are communicatively coupled via a local interface. The local interface can include, for example, but is not limited to, one or more buses and/or other wired or wireless connections. The local interface may have additional elements, which are omitted for simplicity, such as additional controllers, buffers (caches), drivers, repeaters, and receivers to enable communications. Further, the local interface may include address, control, and/or data connections to enable appropriate communications among the aforementioned components.

The example controller module 70 comprises a processor for executing software, particularly software stored in the memory module 66. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory module 66 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, Flash, etc.). Moreover, the memory module 66 may incorporate electronic, magnetic, optical, and/or other types of storage media.

As mentioned previously, the model generating software in the memory module 66 may include one or more additional or separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory module 66.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

The example modeling computer 62 is configured to receive measurements from a plurality of sensors 76 and other devices within the engine 10. Example measurements received from the sensors 76 include measurements from the engine modules 46, the positions of the subsystem actuators 54, measurements from the subsystem sensors 58, etc.

The measurements received by the modeling computer 62 generally fall into three categories: engine inputs (U), gas path parameters (Y), and engine subsystem parameters (Z). Example engine inputs include mach numbers, altitudes, total ambient temperatures, engine power requirements, etc. Example gas path parameters include measurements collected along the engine's gas path, such as low spool speeds, high spool speeds, exhaust gas temperatures, etc. Example subsystem parameter measurements include turbine case cooling measurements, bleed measurements, variable stator vane measurements, etc.

In this example, the modeling computer 62 is configured to generate modeled gas path parameters ($\hat{y}$) based on the engine inputs received from the engine 10. The example modeling computer 62 is further configured to generate modeled subsystem parameters ($\hat{z}$) based on the engine inputs received from the engine 10.

Once generated, the modeling computer 62 compares the modeled gas path parameter ($\hat{y}$) to an actual gas path parameter (y) measured from the engine 10 and determines a difference between the two. Similarly, the modeling computer 62 compares modeled subsystem parameter ($\hat{z}$) generated by the modeling computer 62 to an actual subsystem parameter (z) measured from the engine 10.

Figure 3A:
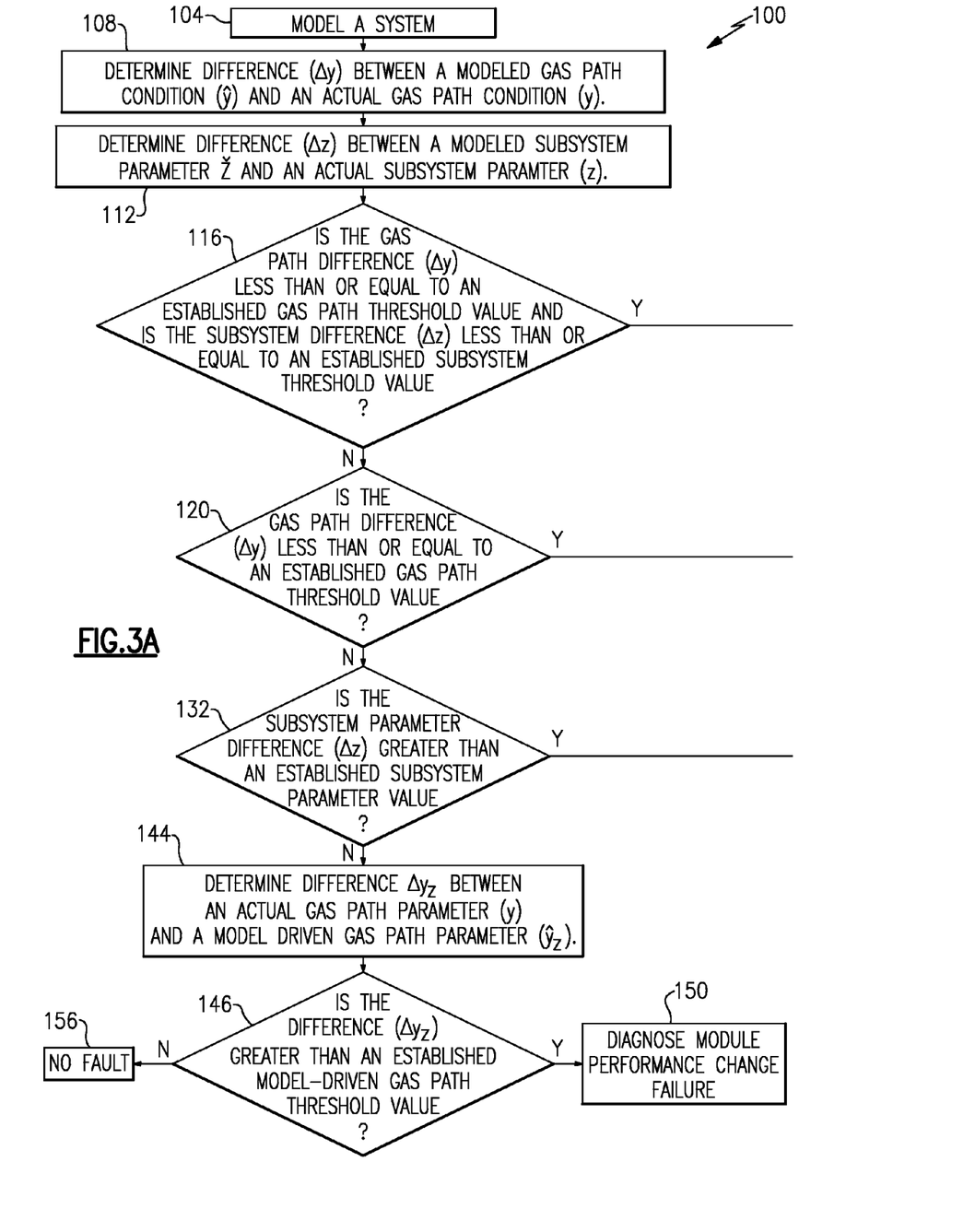
FIGS. 3A and 3B show a flow of an example method for partitioning faults utilizing the FIG. 1 arrangement.
Figure 3B:
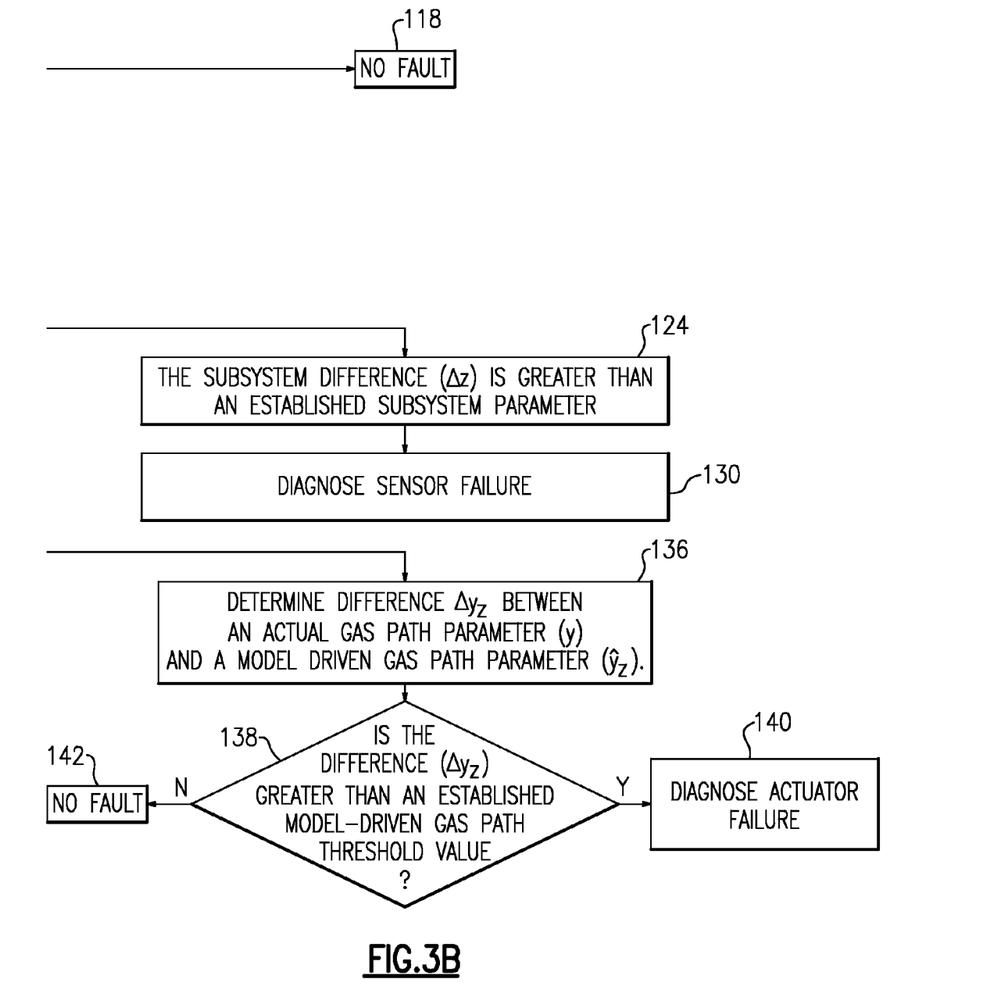

Referring to FIGS. 3A and 3B with continuing reference to FIG. 2, an example diagnosis method 100 uses the differences to partition faults into three categories of faults: faults of the subsystem sensors 58, faults of the subsystem actuators 54, and faults in the performance of engine modules 46.

Example failures of the subsystem sensors 58 include a sensor failing to properly measure feedback of the subsystem parameter values of the engine 10. A sensor measuring turbine case cooling positions may fail during operation of the engine, for example.

Example failures of the subsystem actuators 54 include a subsystem actuator of the engine 10 that is stuck at a particular position or not operating as controlled. For example, a bleed 2.5 actuator may not completely close or completely open when such actions are initiated.

Example fault associated with module performance includes one of the engine modules 46 operating at a reduced efficiency. For example, the high pressure compressor 18 has a particular flow capacity and efficiency that experiences a change in performance due to contamination or fouling in the high pressure compressor.

At a step 104, the diagnosis method 100 models the engine 10, a type of system, using the modeling computer 62. The diagnosis method 100 determines the difference ($\Delta y$) between the modeled gas path condition ($\hat{y}$) and the actual gas path condition (y) at a step 108. The diagnosis method 100 determines a difference between the modeled subsystem parameter ($\hat{z}$) and the actual subsystem parameter (z) at a step 112.

At a step 116, the diagnosis method 100 determines whether the gas path difference ($\Delta y$) determined in the step 108 is less than or equal to an established gas path threshold value ($\alpha$). The method at the step 116 also determines if the subsystem difference ($\Delta z$) is less than or equal to an established subsystem threshold value ($\beta$). In one example, a threshold value for n1 is $\Delta y > \alpha 2\%$ RPM, a threshold value for EGT is $y > \alpha 50°$ C., a threshold value for TCC is $\Delta z > 5\% \leftarrow \beta$, and a threshold value for B25 bleed is $\Delta z > 3\%$ If the gas path difference ($\Delta y$) is less than or equal to the established gas path threshold value, and if the subsystem difference ($\Delta z$) is less than or equal to the established subsystem threshold value, the diagnosis method 100 moves to a step 118 and determines that there is no fault capable of partitioning. Otherwise, the diagnosis method 100 moves to a step 120.

At the step 120, the diagnosis method 100 determines if the gas path difference ($\Delta y$) is less than or equal to the established gas path threshold value ($\alpha$). If yes, the diagnosis method 100 can deduce at a step 124 that the subsystem difference is greater than an established subsystem parameter (based on the step 116). The diagnosis method 100 then diagnosis a sensor failure at a step 130.

In this example, recall that the failure diagnosed at step 130 refers to a condition where a sensor measuring the subsystem parameter values (z) has failed during operation of the engine 10. During this type of failure, there is no significant disagreement between the measured gas path parameters (y) and model-assumed gas path parameters (ŷ). This is because the gas path parameter measurements are based on the position of the actuator and not on the sensor measurements of feedback engine sub-system parameters (z). As shown in Equation (1), the gas path parameters delta is below the threshold value when a sensor failure is diagnosed at the step 130.

$$\Delta y \leq \alpha \quad (1)$$

There is also considerable disagreement between the measured sub-system parameters (z) and modeled sub-system parameters (ẑ) when a sensor failure is diagnosed at the step 130. This is because the measured sub-system parameters (z) come directly from the sensor 26, which in this case has failed. As a result, engine sub-system parameters deltas (Δz) are above a certain threshold (provided β>0) as shown in Equation (2).

$$\Delta z > \beta \quad (2)$$

If the gas path difference (Δy) is not less than or equal to the established gas path threshold value (α) at the step 120, the diagnosis method 100 then determines if the subsystem difference (Δz) established in the step 112 is greater than the subsystem threshold value (β) at a step 132. If yes, the diagnosis method determines the difference (Δy$_z$) between the actual gas path parameter (y) and the model driven parameter (ŷ) at a step 136.

The diagnosis method 100 then determines if the difference (Δŷ$_z$) in the step 136 is less than or equal to an established model driven gas path threshold value at a step 138. If yes, the diagnosis method 100 diagnoses an actuator failure at a step 140. A user is then able to focus a repair or replacement procedure to the particular actuator within the engine 10, for example.

If the difference (Δy$_z$) in the step 138 is not less than or equal to the established model driven gas path threshold value, the diagnosis method 100 determines, at a step 142, that there is no fault capable of partitioning.

In this example, the actuator failure at the step 140 represents a condition where engine sub-system actuator is stuck at a certain position or not operating as controlled (e.g., a bleed 2.5 actuator not completely closed or not completely open). During this type of a failure there will be considerable disagreement between the measured gas-path parameters (y) and modeled gas-path parameters (ŷ). This is because the measured gas-path parameters are directly related to the position of the actuator, which in this case is the cause for failure. The gas path parameters deltas are above a certain threshold when the actuator failure is diagnosed the step 140 as shown in Equation (3).

$$\Delta y > \alpha \quad (3)$$

Also during this type of failure, there will be considerable disagreement between the actual subsystem parameters (z) and modeled subsystem parameters (ẑ) as shown in Equation (4). This is because, unlike a sensor failure, an actuator failure will affect the measured sub-system parameters.

$$\Delta z > \beta \quad (4)$$

Referring again to the step 132, if the subsystem parameter difference (Δz) is not greater than the established subsystem parameter threshold value, the diagnosis method 100 determines the difference (Δy$_z$) between the actual gas path parameter (y) and the modeled gas path parameter (ŷ$_z$) at a step 144. The diagnosis method 100 then determines if the difference (Δy$_z$) is greater than an established model driven gas path threshold value at a step 146. If yes, the diagnosis method 100 diagnoses an module performance change failure at a step 150. The user is then able to focus a repair or replacement procedure on that module within the engine 10, for example.

If the difference in the step 146 is not less than or equal to the established model driven gas path threshold value, the diagnosis method 100 determines, at a step 156, that there is no fault capable of partitioning.

In this example, the module performance change failure diagnosed in the step 150 refers to a condition where the engine module 46 is operating at reduced efficiency (e.g., high pressure flow capacities and efficiencies changing due to contamination or fouling in HPC). During this type of a failure there will be considerable disagreement between the measured gas-path parameters (y) and modeled gas-path parameters (ŷ) because the measured gas-path parameters are directly related to the performance of engine modules 46. As shown in Equation (5), the gas path parameters deltas are above a certain threshold (α>0) when the module performance change failure is diagnosed.

$$\Delta y > \alpha \quad (5)$$

The model driven gas path parameter (ŷ$_z$) at the step 144 is determined by driving the engine model 64 to have the same sub-system parameter setting as the actual engine 10. For example, the engine model 64 is driven to generate model subsystem parameters that are the same as the system parameter.

Figure 4:
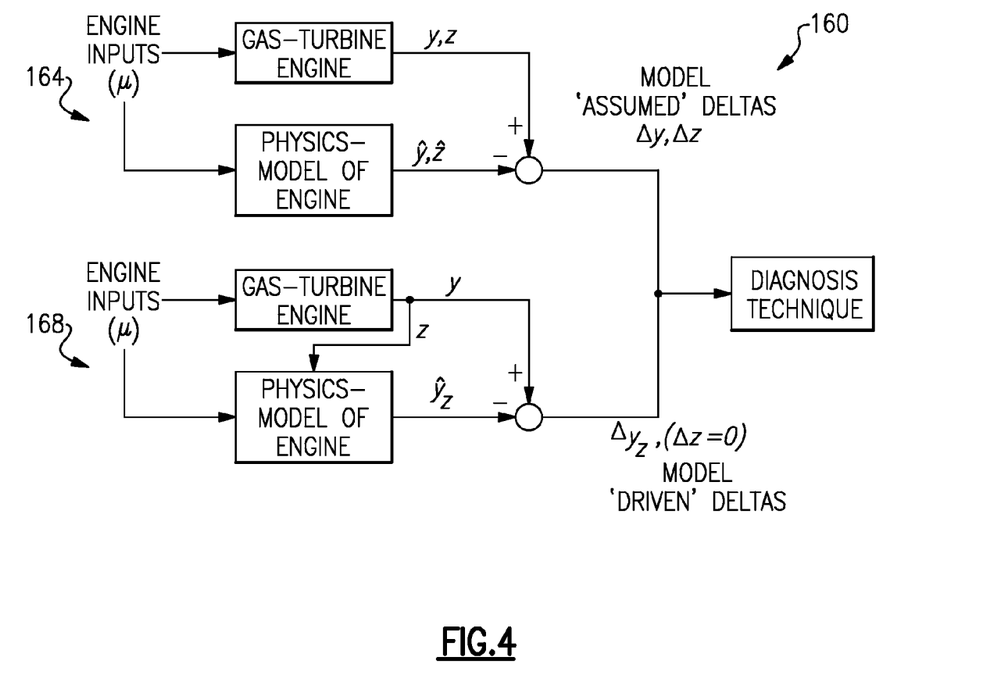
FIG. 4 shows a schematic method of providing model driven gas path parameters for the FIGS. 3A and 3B method.

Referring to FIG. 4 with continuing reference to FIGS. 2-3, a collection method 160 is used to gather the variables utilized in the example method 100. A portion of the method 164 shows the measured gas path parameters (y) and the measured sub-system parameters (z) obtained from the actual engine measurements compared to the modeled values. Another portion of the method 168 shows the model when driven with the measured subsystem parameters (z) compared to the modeled values.

In the method 160, the model-driven gas path parameter delta is represented as (ŷ$_z$). In the method 160, the model-driven sub-system parameters (ẑ) are the same as the measured sub-system parameters (z). As a result, the model-assumed deltas of the sub-system parameters are zero (Δz=0). The model-driven gas path parameters deltas (Δy$_z$) are utilized in portions of the method 100.

The model driven gas path parameters (ŷ$_z$) are estimates of gas-path parameters (y) using a schedule that is based on engine inputs (u) and engine subsystem parameters (z). As shown in Equation (6), the model driven gas path parameter deltas (Δy$_z$) represent the deviation of measured gas path parameters (y) from the model-driven estimates of gas-path parameters (ŷ$_z$).

$$\Delta y_z = |y - \hat{y}_z| \quad (6)$$

In this example, a failed actuator is the cause for the difference in the model-assumed gas path parameters (ŷ) and model-driven gas path parameters (ŷ$_z$). Thus, if the method 100 diagnoses an actuator failure at the step 150, the model-driven gas-path parameters ($\hat{y}_z$) and the model-assumed gas-path parameters ($\hat{y}$) are both below the threshold (provided γ>0) as shown in Equation (7).

$$\Delta y_z \le \gamma \tag{7}$$

In this example, a module performance change failure is indicated when the deltas of model-driven gas-path parameters ($\Delta y_z$) are above some threshold (provided γ>0) as shown in Equation (8) after driving the model with the measured subsystem parameters (z).

$$\Delta y_z > \gamma \tag{8}$$

Table 1 shows the diagnosis logic for the example method 100.

| Condition 1 | Condition 2 | Condition 3 | Diagnosis |
|---|---|---|---|
| $\Delta y \le \alpha$ | $\Delta z > \beta$ | — | Sensor Failure |
| $\Delta y > \alpha$ | $\Delta z > \beta$ | $\Delta y_z \le \gamma$ | Actuator Failure |
| $\Delta y > \alpha$ | $\Delta z \le \beta$ | $\Delta y_z > \gamma$ | Module Performance Change |

Features of the disclosed example include identifying faults within a particular area of an engine based on data analysis rather than physical examination of the engine.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A method of partitioning turbomachine faults, comprising:
   using a modeling computer to model a system and to establish a modeled gas path parameter and a modeled subsystem parameter;
   determining a gas path condition representing a difference between an actual gas path parameter and the modeled gas path parameter;
   determining a subsystem condition representing a difference between an actual subsystem parameter and the modeled subsystem parameter;
   diagnosing a sensor failure based on the gas path condition and the subsystem condition;
   adjusting the modeled subsystem parameter to match the actual subsystem parameter;
   determining a model-driven gas path parameter based on the modeled subsystem parameter; and
   diagnosing an actuator failure or a module performance change based on a comparison of the modeled gas path parameter and the model-driven gas path parameter.

2. The method of claim 1, wherein a sensor failure is diagnosed when the gas path condition is less than or equal to an established first gas path threshold value and the subsystem condition is greater than a subsystem threshold value.

3. The method of claim 1, wherein an actuator failure is diagnosed when the gas path condition is greater than a first gas path threshold value, the subsystem condition is greater than a subsystem threshold value, and the model-driven gas path parameter is less than or equal to a second path threshold value.

4. The method of claim 1, wherein a module performance change failure is diagnosed when the gas path condition is greater than a first gas path threshold value, the subsystem condition is less than or equal to a subsystem threshold value, and the model-driven gas path parameter is greater than a second gas path threshold value.

5. The method of claim 1, including utilizing a physics-based system model to establish the modeled gas path parameter and the modeled subsystem parameter.

6. The method of claim 1, wherein the actual gas path parameter comprises a measurement collected along a gas path of a turbomachine.

7. The method of claim 1, wherein the modeled gas path parameter and the modeled subsystem parameter are calculated using a model that is exclusively adjusted using gas turbine engine input variables.

8. A method of partitioning gas turbine engine faults, comprising:
   establishing, using a modeling computer, a model of a gas turbine engine;
   using the model to determine, using the modeling computer, a modeled gas path parameter and a modeled subsystem parameter;
   identifying, using the modeling computer, a fault in the gas turbine engine based on a comparison of the modeled gas path parameter to a measurement of an actual gas path parameter of the gas turbine engine and a comparison of the modeled subsystem parameter to an actual subsystem parameter from the gas turbine engine;
   adjusting, using the modeling computer, the modeled subsystem parameter to match the actual subsystem parameter;
   determining, using the modeling computer, a modeled-driven gas path parameter based on the modeled subsystem parameter; and
   diagnosing, using the modeling computer, an actuator failure or a module performance change based on a comparison of the modeled gas path parameter and the model-driven gas path parameter.

9. The method of claim 8, wherein the fault comprises a sensor failure.

10. The method of claim 8, wherein an actuator failure is diagnosed when the gas path condition is greater than a first gas path threshold value, the subsystem condition is greater than a subsystem threshold value, and the model-driven gas path parameter is less than or equal to a second path threshold value.

11. The method of claim 8, wherein a module performance change is diagnosed when the gas path condition is greater than a first gas path threshold value, the subsystem condition is less than or equal to a subsystem threshold value, and the model-driven gas path parameter is greater than a second gas path threshold value.

12. A turbomachine fault partitioning arrangement, comprising:
   a modeling computer configured to establish a model of a turbomachine, the modeling computer further configured to determine a modeled gas path parameter and a modeled subsystem parameter;
   a controller module configured to identify a fault of the turbomachine based on a first comparison of the modeled gas path parameter to a measurement of an actual gas path parameter, and a second comparison of the modeled subsystem parameter to an actual subsystem parameter; and
   a controller is further configured to adjust the modeled subsystem parameter to match the actual subsystem parameter, to determine a modeled-driven gas path parameter based on the modeled subsystem parameter, and to diagnose an actuator failure or a module performance change based on a comparison of the modeled gas path parameter and the model-driven gas path parameter.

13. The turbomachine fault partitioning arrangement of claim 12, wherein fault comprises a sensor failure.

14. The turbomachine fault partitioning arrangement of claim 12, wherein the actual gas path parameter and the actual subsystem parameters are received from at least one sensor of the gas turbine engine.

15. The method of claim 12, wherein the controller module is configured to diagnose an actuator failure when the gas path condition is greater than a first gas path threshold value, the subsystem condition is greater than a subsystem threshold value, and the model-driven gas path parameter is less than or equal to a second path threshold value.

* * * * *